(12) United States Patent
Agrawal et al.

(10) Patent No.: US 10,657,401 B2
(45) Date of Patent: May 19, 2020

(54) BIOMETRIC OBJECT SPOOF DETECTION BASED ON IMAGE INTENSITY VARIATIONS

(71) Applicant: Microsoft Technology Licensing, LLC, Redmond, WA (US)

(72) Inventors: Mudit Agrawal, Bellevue, WA (US); Akihiro Tsukada, Tokyo (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 198 days.

(21) Appl. No.: 15/901,377

(22) Filed: Feb. 21, 2018

(65) Prior Publication Data

US 2018/0349721 A1  Dec. 6, 2018

Related U.S. Application Data

(60) Provisional application No. 62/515,828, filed on Jun. 6, 2017.

(51) Int. Cl.
*G06K 9/00* (2006.01)
*G06F 21/32* (2013.01)

(52) U.S. Cl.
CPC ......... *G06K 9/00906* (2013.01); *G06F 21/32* (2013.01); *G06K 9/00114* (2013.01);
(Continued)

(58) Field of Classification Search
CPC ........... G06K 9/00906; G06K 9/00604; G06K 9/00617; G06K 9/00114; G06F 21/32; G06F 2221/2133
See application file for complete search history.

(56) References Cited

U.S. PATENT DOCUMENTS 4,641,349 A * 2/1987 Flom ............ A61B 3/1216
351/205
5,953,441 A * 9/1999 Setlak ........... G01B 7/004
340/5.83

(Continued)

OTHER PUBLICATIONS

Rastogi, et al., "Performance Comparison of Fake Iris Detection Methods", In International Journal of Information and Computation Technology, vol. 3, No. 10, 2013, pp. 1-5.

(Continued)

*Primary Examiner* — Xuemei G Chen
(74) *Attorney, Agent, or Firm* — Arent Fox LLP

(57) ABSTRACT

Apparatus and methods of biometric object spoof detection are configured to receive at least first and second images, including a biometric object, respectively captured at a first and second time in response to a first and second incident light. The first and second incident light is emitted from at least one light source at substantially a same wavelength, but with different sets of illumination characteristics. Further, the apparatus and method are configured to respectively determine a first set and a corresponding second set of reflection intensity features respectively based on at least a part of the first and second images, and to determine a set of reflection intensity difference features based on an intensity difference therebetween. Additionally, the apparatus and methods are configured to classify the biometric object as being a fake object or a real object based on at least one of the reflection intensity difference features.

23 Claims, 8 Drawing Sheets

(52) U.S. Cl.
CPC ..... *G06K 9/00604* (2013.01); *G06K 9/00617* (2013.01); *G06F 2221/2133* (2013.01)

(56) References Cited

U.S. PATENT DOCUMENTS

| | | | | |
|---|---|---|---|---|
| 7,254,255 | B2* | 8/2007 | Dennis | G06K 9/00013 |
| | | | | 382/115 |
| 7,417,727 | B2* | 8/2008 | Polonskiy | A61B 5/0059 |
| | | | | 356/300 |
| 7,539,330 | B2 | 5/2009 | Rowe | |
| 8,243,133 | B1 | 8/2012 | Northcott et al. | |
| 8,374,407 | B2* | 2/2013 | Benkley | G06K 9/0012 |
| | | | | 382/124 |
| 8,798,333 | B2 | 8/2014 | Hanna et al. | |
| 8,977,010 | B2* | 3/2015 | Frischholz | G06K 9/00899 |
| | | | | 382/115 |
| 9,396,537 | B2* | 7/2016 | Hirvonen | G06K 9/56 |
| 9,400,916 | B1 | 7/2016 | Brownlee | A61B 5/1172 |
| 9,454,699 | B2* | 9/2016 | Agrawal | G06K 9/0061 |
| 9,672,415 | B2* | 6/2017 | Pfursich | G06K 9/00899 |
| 9,898,596 | B2* | 2/2018 | Lindemann | G06Q 20/42 |
| 9,922,238 | B2* | 3/2018 | Bourlai | G06K 9/00288 |
| 9,953,149 | B2* | 4/2018 | Tussy | G06K 9/00288 |
| 10,049,272 | B2* | 8/2018 | Agrawal | G06K 9/00604 |
| 10,311,289 | B2* | 6/2019 | Sun | G06K 9/00281 |
| 10,430,652 | B2* | 10/2019 | Gacon | G06K 9/00906 |
| 10,452,894 | B2* | 10/2019 | Zhang | G06K 9/00255 |
| 2004/0170304 | A1* | 9/2004 | Haven | A61B 3/113 |
| | | | | 382/115 |
| 2007/0110285 | A1* | 5/2007 | Hanna | G06K 9/00604 |
| | | | | 382/117 |
| 2007/0280513 | A1* | 12/2007 | Engheta | A61B 5/1172 |
| | | | | 382/124 |
| 2008/0181467 | A1 | 7/2008 | Zappia | |
| 2009/0060286 | A1 | 3/2009 | Wheeler et al. | |
| 2014/0072183 | A1* | 3/2014 | Hanna | G06K 9/00604 |
| | | | | 382/117 |
| 2014/0240477 | A1* | 8/2014 | Feng | H04N 5/217 |
| | | | | 348/77 |
| 2015/0205992 | A1* | 7/2015 | Rowe | G06K 9/2018 |
| | | | | 382/124 |
| 2015/0242680 | A1* | 8/2015 | Thukral | G06K 9/00335 |
| | | | | 348/78 |
| 2015/0310253 | A1* | 10/2015 | Agrawal | G06K 9/0061 |
| | | | | 382/103 |
| 2015/0326570 | A1 | 11/2015 | Publicover et al. | |
| 2016/0019421 | A1 | 1/2016 | Feng et al. | |
| 2016/0117544 | A1* | 4/2016 | Hoyos | H04N 5/23219 |
| | | | | 348/78 |
| 2017/0046583 | A1* | 2/2017 | Rodriguez | G06K 9/00906 |
| 2017/0091550 | A1* | 3/2017 | Feng | G06K 9/00597 |
| 2017/0098116 | A1* | 4/2017 | Brownlee | A61B 5/1172 |
| 2017/0109560 | A1* | 4/2017 | Chen | G06K 9/00033 |
| 2017/0161578 | A1* | 6/2017 | Ivanisov | G06K 9/00899 |
| 2017/0323167 | A1* | 11/2017 | Mapen | G06K 9/4661 |
| 2018/0034812 | A1* | 2/2018 | Rahman | H04L 63/0861 |
| 2018/0096212 | A1* | 4/2018 | Lin | G06F 16/5838 |
| 2018/0173980 | A1* | 6/2018 | Fan | G06K 9/00906 |
| 2018/0336397 | A1* | 11/2018 | Smith | G06K 9/00288 |
| 2019/0034020 | A1* | 1/2019 | He | G02F 1/13338 |
| 2019/0150799 | A1* | 5/2019 | Hogan | A61B 5/0066 |
| 2019/0213312 | A1* | 7/2019 | Tussy | G06K 9/00288 |
| 2019/0251380 | A1* | 8/2019 | Park | G06K 9/6289 |

OTHER PUBLICATIONS

Bodade, et al., "Fake Iris Detection: A Holistic Approach", In International Journal of Computer Applications, vol. 19, No. 2, Apr. 2011, pp. 1-7.

* cited by examiner

BIOMETRIC OBJECT SPOOF DETECTION BASED ON IMAGE INTENSITY VARIATIONS

CLAIM OF PRIORITY UNDER 35 U.S.C. § 119

The present application for patent claims priority to Provisional Application No. 62/515,828, entitled "BIOMETRIC OBJECT SPOOF DETECTION BASED ON IMAGE INTENSITY VARIATIONS" filed Jun. 6, 2017, which is assigned to the assignee hereof and hereby expressly incorporated by reference herein for all purposes.

BACKGROUND

The present disclosure relates to biometric identification, and more particularly, to an apparatus and method of biometric object spoof detection based on image intensity variations.

Within the field of computing, many scenarios involve an identification of an individual using one or more biometrics. In one example, for instance, iris recognition is considered as one of the most secure forms of biometric authentication and verification. With cameras becoming smaller, products are now available in the market that use iris recognition as a primary mode of authentication to secure all the data on the device they intend to protect. With the ability for anyone to take a picture of your face with high fidelity, the possibility of spoof attacks has increased. This makes anti-spoofing more important, and a harder problem to solve.

Current solutions for iris spoof detection, may be grouped into 3 classes:

(1) Analysis of iris texture pattern to distinguish a printed iris or real one. This is a popular approach, however, a con of this solution is that it is possible to print out high quality iris pattern because recent 2D/3D printers have high quality and high-usability to spoof iris recognition systems.

(2) Use of an additional device, e.g. combining an infrared (IR) camera and a red, green blue (RGB) camera or depth sensor. This approach may use human skin or face structure information to detect spoofing. Some cons of this solution, however, are that it is more expensive, it needs space to attach the additional device, and it may not work in low-light environments (e.g. if RGB camera is used).

(3) Detecting movements—In one implementation, such solutions may detect uncontrollable movements, for example, humans cannot stop eye movements called "saccadic suppression." In other implementations, such solutions may ask users to take unique actions, e.g., blinking, looking away or turning their face. A con of these approaches is that they can take extra time (e.g., extending the time to log in), they may be bothersome for users to take explicit actions, and/or they may destroying the 'magic' of biometric by requiring explicit actions.

Further, when utilizing such biometric identification systems in a mobile computing device, the constraints get much harder than in stationary systems due to the potential of independent movement between the mobile computing device and the user.

Thus, there is a desire for improvements in the field of identification of an individual using one or more biometrics.

SUMMARY

The following presents a simplified summary of one or more features described herein in order to provide a basic understanding of such features. This summary is not an extensive overview of all contemplated features, and is intended to neither identify key or critical elements of all features nor delineate the scope of any or all implementations. Its sole purpose is to present some concepts of one or more features in a simplified form as a prelude to the more detailed description that is presented later.

In an implementation, a method of biometric object spoof detection, includes receiving a first image, including a biometric object, captured at a first time in response to a first incident light emitted from a light source at a wavelength with a first set of illumination characteristics, and receiving a second image, including the biometric object, captured at a second time in response to a second incident light emitted from the light source at the wavelength with a second set of illumination characteristics. The method also includes determining a first set of one or more reflection intensity features based on at least a part of the first image, and determining a second set of one or more reflection intensity features based on at least a part of the second image, wherein each of the second set of one or more reflection intensity value features corresponds to one of the first set of one or more reflection intensity features. The method further includes determining a set of one or more reflection intensity difference features based on an intensity difference between at least one of the first set of one or more reflection intensity features and a corresponding at least one of the second set of one or more reflection intensity features, and classifying the biometric object as being a fake object or a real object based on at least one of the set of one or more reflection intensity difference features.

In another implementation, a computer device for biometric object spoof detection includes a processor and a memory in communication with the processor, wherein the processor is configured to receive a first image, including a biometric object, captured at a first time in response to a first incident light emitted from a light source at a wavelength with a first set of illumination characteristics, and receive a second image, including the biometric object, captured at a second time in response to a second incident light emitted from the light source at the wavelength with a second set of illumination characteristics. The processor is also configured to determine a first set of one or more reflection intensity features based on at least a part of the first image, and determine a second set of one or more reflection intensity features based on at least a part of the second image, wherein each of the second set of one or more reflection intensity features corresponds to one of the first set of one or more reflection intensity features. The process is further configured to determine a set of one or more intensity difference features based on an intensity difference between at least one of the first set of one or more reflection intensity features and a corresponding at least one of the second set of one or more reflection intensity features, and classify the biometric object as being a fake object or a real object based on at least one of the set of one or more reflection intensity difference features.

In yet another implementation, a computer readable medium storing one or more programs having executable instructions by a computer device, includes instructions causing the computer device to receive a first image, including a biometric object, captured at a first time in response to a first incident light emitted from a light source at a wavelength with a first set of illumination characteristics, and receive a second image, including the biometric object, captured at a second time in response to a second incident light emitted from the light source at the wavelength with a second set of illumination characteristics. The instructions also causing the computer device to determine a first set of one or more reflection intensity features based on at least a part of the first image, and determine a second set of one or more reflection intensity features based on at least a part of the second image, wherein each of the second set of one or more reflection intensity features corresponds to one of the first set of one or more reflection intensity features. The instructions further causing the computer device to determine a set of one or more intensity difference features based on an intensity difference between at least one of the first set of one or more reflection intensity features and a corresponding at least one of the second set of one or more reflection intensity features, and classify the biometric object as being a fake object or a real object based on at least one of the set of one or more reflection intensity difference features.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Figure 1:
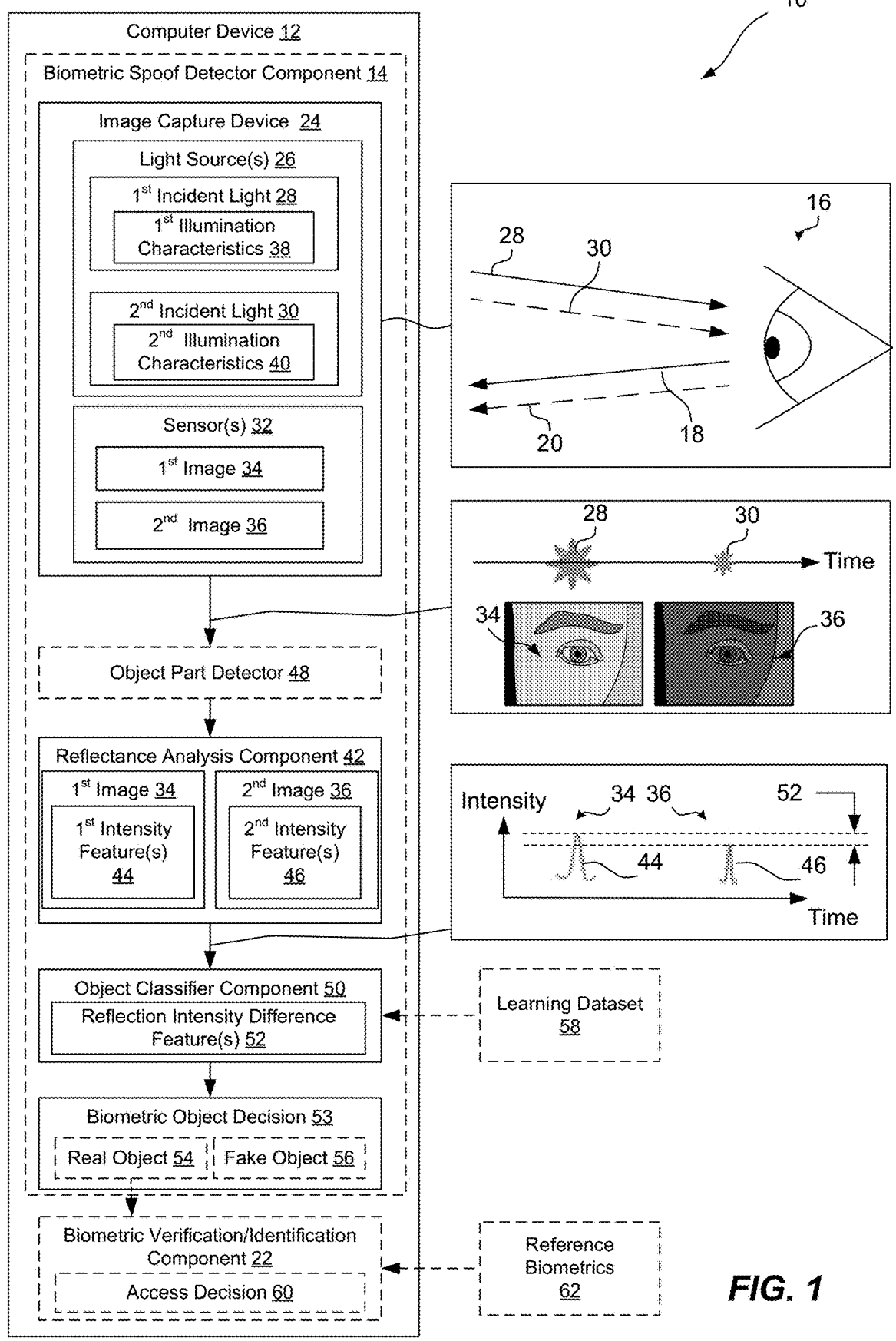
FIG. 1 is a schematic diagram of an example of a computer device in which features of the present disclosure may operate.

The apparatus and methods described herein relate to verifying whether a biometric object that is presented, for example, to access a computer device, is a real biometric object or a fake biometric object. According to the present disclosure, the computer device can make the spoof determination based on one or more reflection intensity differences between one or more sets of images of the biometric object, where the set of images are captured under relatively varying illumination intensities. Each set of the relatively high illumination intensity image and the relatively low illumination intensity image are captured based on the biometric object being respectively exposed, at different times, to different incident light having different illumination. For example, each of the different illumination characteristics include a different value of at least one of an illumination power, an exposure time, an angle of incidence, or any characteristic resulting in a different signal-to-noise ratio between the first image and the second image. Notably, however, the different incident light corresponding to each image has the same or substantially the same wavelength. Due to variations in the living structure of a real biometric object as compared to a fake biometric object, one or more reflection intensity features (e.g., any characteristic of a reflection intensity) will be different for a real biometric object as compared to a fake or spoofed biometric object when comparing intensity differences between the high and low illumination intensity images. Accordingly, the apparatus and methods described herein detect one or more of the resulting reflection intensity differences between the relatively high and low illumination intensity images and, based on these reflection intensity differences, can identify the presented biometric object as being a real biometric object or a fake biometric object. In some cases, such as when the biometric object is an eye, the reflection intensity features that are evaluated may relate to a glint intensity, an overall image intensity, and/or one or more eye-part or area of interest reflection intensities. Further, in some optional implementations, the computer device may then perform biometric identification when the biometric object is identified as being real. The computer device may utilize the same light source for the biometric identification as for the spoof detection performed on the biometric object, thereby improving efficiency in the manufacture and operation of the computer device.

Various examples are now described in more detail with reference to the FIGS. 1-11. In the following description, for purposes of explanation, numerous specific details are set forth in order to provide a thorough understanding of one or more examples. It may be evident, however, that such examples may be practiced without these specific details. Additionally, it should be noted that the term "component" as used herein may be one of the parts that make up a system, may be hardware, firmware, and/or software stored on a computer-readable medium and executable by a processor, and may be divided into other components.

Moreover, the examples described herein are not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples Referring to FIG. 1, a biometric object spoof detection and/or identification system 10 includes a computer device 12 having a biometric spoof detector component 14 configured to verify whether a biometric object 16 is real or fake (e.g., a spoof) based on intensity differences between a first and second reflected light 18, 20 reflected off of biometric object 16. Biometric spoof detector component 14 may also be referred to as a biometric anti-spoofing component or a biometric presentation attack detection component. Optionally, computer device 12 may further include a biometric verification/identification component 22 configured to verify an identify of the user when biometric object 16 is determined to be real. Biometric object 16 may include one or more of any type of living tissue of the user that can be captured in an image, such as but not limited to an eye, an iris, sclera, skin, a face, a fingerprint, or any other type of living tissue object. Biometric object spoof detection and/or identification system 10 may be used to control access to computer device 12, or to another computer device. Further, biometric object spoof detection and/or identification system 10 may be used to detect a spoof or imitation of biometric object 16, e.g., a fake biometric object that may be used by an attacker in order to attempt to gain unauthorized access to computer device 12 (or another computer device controlled by computer device 12).

In an example implementation, which should not be construed as limiting, computer device 12 includes an image capture device 24 having a controller configured to operate one or more light sources 26 to generate and direct first and second incident light 28, 30 toward biometric object 16, and to operate one or more sensors 32 to capture the corresponding first and second reflected light 18, 20, respectively, correspondingly reflected off the biometric object 16. In response, sensor(s) 32 may convert the received first and second reflected light 18, 20 respectively into first image 34 and second image 36 of biometric object 16 for use in performing verification/identification of biometric object 16. Light source(s) 26 may be any type of device capable of generating any wavelength of light, such as but not limited to a light emitting diode (LED), an electroluminescent panel (ELP), and/or a light bulb. In one implementation, although any wavelength of light can be used, the apparatus and methods of the present disclosure utilize light source(s) 26 configured to generate infrared (IR) light in order to utilize light sources and corresponding sensor that may already be utilized for biometric verification/identification, thereby reducing the need for extra components. For example, but not to be construed as limiting, the IR light having wavelengths in the range of about 700 nanometers (nm) to 1000 nm, or more preferably in the range of about 800 nm to 1000 nm, or more preferably in the range of about 800 nm to 900 nm. Also, for example, visible light having wavelengths in the range of about 400 nm to 700 nm may be utilized. It should be understood that the above example wavelengths are merely examples, and the present disclosure allows for any wavelength to be used, e.g., no matter what wavelength is being used for biometric identification or verification, the apparatus and methods of this disclosure can change the intensity of the light source(s) to understand the details of the reflected medium and identify a real or fake (spoofed) biometric object 16. Sensor(s) 32 may by any type of device capable of receiving light waves and/or electromagnetic radiation and converting them into an image. Suitable examples of sensor(s) 32 include, but are not limited to, an image sensor, a charge-coupled devices (CCD), and/or an active pixel sensor in a complementary metal-oxide-semiconductor (CMOS) or N-type metal-oxide-semiconductor (NMOS, Live MOS) technology.

More specifically, image capture device 24 may control light source(s) 26 to generate and emit one or more sets of first and second incident light 28, 30 at different times and at a same (or substantially similar) wavelength, but with different illumination characteristics in order to identify whether a real or fake biometric object 16 has been presented to biometric spoof detector component 14 based on an analysis of reflection intensity differences between the corresponding first and second images 34, 36. In some instances, only a single set of first and second images 34, 36 may be utilized, while in other cases multiple sets of images may be utilized in order to double-check or obtain a higher confidence in the decision as to whether the presented biometric object 16 is real or fake. In some cases, the wavelength of each set of first and second incident light 28, 30 may be the same as, within a similar range, or within a capability of the same light source(s) 26 used by biometric verification/identification component 22. In this case, the cost of computer device 12 may be reduced, and/or an efficiency of manufacture and operation, and a weight, of computer device 12 may be reduced (e.g., all by eliminating a need for a different light source). The different times that first and second incident light 28, 30 (and any subsequent pairs) may be emitted correspond to a frame rate, e.g., a rate at which images of biometric object 16 are captured by sensor(s) 32. In some cases, the apparatus and methods described herein may utilize a relatively high frame rate in order to avoid or minimize movement of parts of biometric object 16 between first image 34 and second image 36 and/or any subsequent pairs of images. This enables identification of different parts of biometric object 16 using the one of the first and second images 34, 36 having the relatively higher illumination characteristics, as such parts may be difficult to identify in the image having relatively lower illumination characteristics. As such, parts of biometric object 16 can be mapped from one image to the other image for subsequent comparison of reflectance intensity features, as described below. For example, but not to be construed as limiting, one such relatively high frame rate may include a frame rate of up to 60 frames per second. In other cases, a relatively low frame rate may be utilized, however, in these cases the movement of features of biometric object 16 between first image 34 and second image 36 may have to be detected and accounted for when comparing reflectance intensity features of parts of biometric object 16 between the two images. Further, the different set of illumination characteristics may include a first set of illumination characteristics 38 for first incident light 28, and a second set of illumination characteristics 40 for second incident light 30. Each set of illumination characteristics 38, 40 may include one or more illumination characteristics, and a different value of at least one illumination characteristic in each set. Suitable examples of an illumination characteristic include, but are not limited to, one or more of an intensity or illumination power (e.g., radiance or irradiance; measured in Watt per steradian per square meter ($W/sr/m^2$) for radiance and Watt per square meter ($W/m^2$) for irradiance, a duration or exposure time (e.g., an amount of time that biometric object 16 is exposed to the light), or an angle of incidence (e.g., an angle at which the light hits a surface of biometric object 16), or any characteristic resulting in a different signal-to-noise ratio (e.g., there is higher relative noise in the lower illumination image) between first image 34 and the second image 36. Because first and second incident light 28, 30 are respectively generated with first and second set of illumination characteristics 38, 40, correspondingly, first and second images 34, 36 (based on captured first and second reflected light 18, 20) include different intensities.

Computer device 12 may further include a reflectance analysis component 42 in communication with sensor(s) 32 to receive at least first and second images 34, 36 and respectively identify a first set of one or more reflection intensity features 44 of one or more portions of first image 34 and a corresponding second set of one or more reflection intensity features 46 of a corresponding one or more parts of second image 36. In particular, the reflection intensity features in the first set 44 and the second set 46 relate to one another, e.g., a reflection intensity feature of an iris (or portion thereof) in first image 34 and a corresponding reflection intensity feature of the iris (or portion thereof) in second image 36. The first and second set of one or more reflection intensity features 44, 46 may be, for example, any characteristic or metric that can be used to define a specific measure or representation of a reflection intensity. Examples of a reflection intensity feature include, but are not limited to, one or more of an actual reflection intensity characteristic of a pixel or region or any other pixel intensity-based metric, or a function (e.g., average, mean, absolute value, etc.) of a plurality of reflection intensity values or any other intensity value-based metric, a variance in reflection intensity values or any other variance-based metric, a local binary pattern (LBP)-based metric of reflection intensity values or any other local texture-based metric, a curve of reflection intensity values corresponding to different sections of an image or any parts of a curve, such as an amplitude-based metric, or an intensity feature-based histogram. Further, the intensity of the reflection may be based on the gray value of one or more pixels in the portion of the image being analyzed. Each set of first and second reflected light 18, 20, and hence each set of first and second images 34, 36, may include specular reflection (or surface reflection) and diffuse reflection (or internal reflection), either or both of which may be detected and/or measured by reflectance analysis component 42. For example, the one or more first and second set of one or more reflection intensity features 44, 46 may be a measure of a glint intensity feature of a glint in first image 34 and a glint intensity feature of the corresponding glint in second image 36, where the glints are reflections in a same part of each image. In particular, as used herein, a glint is a specular reflection of light off of a smooth curved surface, such as but not limited to a cornea. As such, a glint intensity feature is any type of reflection intensity feature or characteristic that may be measured from or associated with a given glint. In another example, first and second set of one or more reflection intensity features 44, 46 may be a measure of a respective overall image intensity feature of first and second images 34, 36. In this case, the overall image intensity may be based on a spectral reflection and diffuse reflection of each light source 26 off of the different parts of biometric object 16.

Optionally, in yet another example, the one or more first and second set of one or more reflection intensity features 44, 46 may include respective reflection intensity features that each correspond to a different part or region or pixel of the first and second images 34, 36 of biometric object 16. In other words, in an example related to an eye, first set of one or more reflection intensity features 44 may include different reflection intensity features/values/characteristics/metrics for different eye parts in first image 34, and second set of one or more reflection intensity features 46 may include different reflection intensity features for the corresponding eye parts in second image 36.

In this optional aspect, computer device 12 may also include an object part detector component 48 having shape or pattern detecting functionality, such as shape recognition logic, operable to identify different parts of one or more different types of biometric object 16. In the example of biometric object 16 being an eye, for instance, object part detector component 48 may detect one or more eye-parts in each of first and second images 34, 36 (and any subsequent pairs of images). For example, the one or more eye-parts may include, but are not limited to, a single one or multiple ones or regions of one or more of a glint (which in this case is part of the image of the eye), a pupil, an iris, a sclera, and a periocular region (e.g., skin around the eye, such as an eyelid or the skin below or at the sides off the eye). In some cases, object part detector component 48 may be configured detect and identify a respective eye-part in a relatively higher illuminated (e.g., higher signal-to-noise ratio) one of first and second images 34, 36, and then overlay the other, relatively lower illuminated (e.g., lower signal-to-noise ratio) one of first and second images 34, 36 in order to identify the corresponding eye-part. Such overlaying may be utilized to save time and/or processing resources, and/or because as identifying shapes or patterns matching to eye-parts may be difficult in an under-illuminated (e.g., lower signal-to-noise ratio) image. Moreover, such overlaying has a higher likelihood to be accurate when first and second images 34, 36 are obtained with a sufficient frame rate to reduce movement of respective parts of biometric object 16. Although illustrated as being an independent component, it should be noted that object part detector component 48 may be a part of reflectance analysis component 42.

Computer device 12 additionally includes an object classifier component 50 having a classifier function configured to classify a set of reflection intensity difference features 52 based on the difference between each of the first set of one or more reflection intensity features 44 and the corresponding one of the second set of one or more reflection intensity features 46, and to generate a biometric object classification decision 53 that identifies biometric object 16 as a real object 54 or a fake object 56. In some cases, object classifier component 50 may compare the characteristic/value/metric/ etc. of one or more intensity-difference features 52 to a corresponding one or more intensity difference thresholds in order to determine whether to identify biometric object 16 as real object 54 or fake object 56. For example, each of the one or more intensity difference thresholds for one or more biometric objects 16, or parts thereof, may be based on historical and/or tested data. Further, each of the one or more intensity difference thresholds for one or more biometric objects 16 may be stored in object classifier component 50 or on computer device 12. In other cases, object classifier component 50 may include machine learning or artificial intelligence, e.g., one or more algorithms that can learn from and make predictions on data, where such algorithms overcome following strictly static program instructions by making data-driven predictions or decisions through building a model from sample inputs. As such, object classifier component 50 including machine learning or artificial intelligence can make biometric object classification decision 53 based off of a comparison of the value of reflection intensity difference feature 52 relative to other biometric object classification decision 53 determinations made by object classifier component 50 using a learning dataset 58. Learning dataset 58 may include different values of reflection intensity difference features for different parts of biometric object 16, and/or a set of pre-determined fake objects, and their corresponding biometric object classification decision 53 determinations.

Additionally, it should be noted that although this description provides the example of first and second incident light 28, 30 with first and second set of illumination characteristics 38, 40, and the corresponding first and second images 34, 36 including different intensities, computer device 12 may generate a series of two or more pairs of incident light and capture the corresponding images. In these cases, the one or more reflection intensity features of the one or more additional pairs of images (e.g., beyond the first pair of images) may be utilized by computer device 12 and/or object classifier component 50 to confirm a biometric object classification decision 53, e.g., whether biometric object 16 is real object 54 or fake object 56, arrived at based on one or more prior pairs of images.

In a further option, computer device 12 may additionally include biometric verification/identification component 22, which may be triggered to make an access decision 60 to allow or deny access to computer device 12 when biometric spoof detector component 14 confirms via biometric object classification decision 53 that the presented biometric object 16 is determined to be real object 54. In some cases, biometric verification/identification component 22 may utilize image capture device 24, including the same or a subset of light source(s) 26 and sensor(s) 32 to acquire user verification/identification information. As such, computer device 12 may avoid having different image capture equipment, thereby saving, for example, cost, efficiency, and weight. Biometric verification/identification component 22 may include a biometric identification function that compares the acquired user identification information to a set of reference biometrics 62, e.g., known biometric information corresponding to a known, identified user, in order to make access decision 60.

Thus, computer device 12 executing biometric spoof detector component 14 makes biometric object classification decision 53 to identify the presented biometric object 16 as real or fake, which decision may be utilized to abort or continue a biometric identification process and allow access to a device. Consequently, computer device 12 including biometric spoof detector component 14 improves the efficiency of usage of computer device 12 by avoiding the unnecessary processing of spoofed biometric objects, and also helps to avoid spoofing the biometric identification process and allowing an unauthorized user to access to computer device 12, or another computer device or computer resource controlled by computer device 12. Thus, for example, biometric spoof detector component 14 may be utilized in all different types of biometric identification systems, such as but not limited to providing access to another computer device, providing access to an automated teller machine, authenticating a credit card purchase using a mobile device (e.g. buying items in a grocery store, buying an item on-line, such as applications in an application store), etc.

Figure 2:
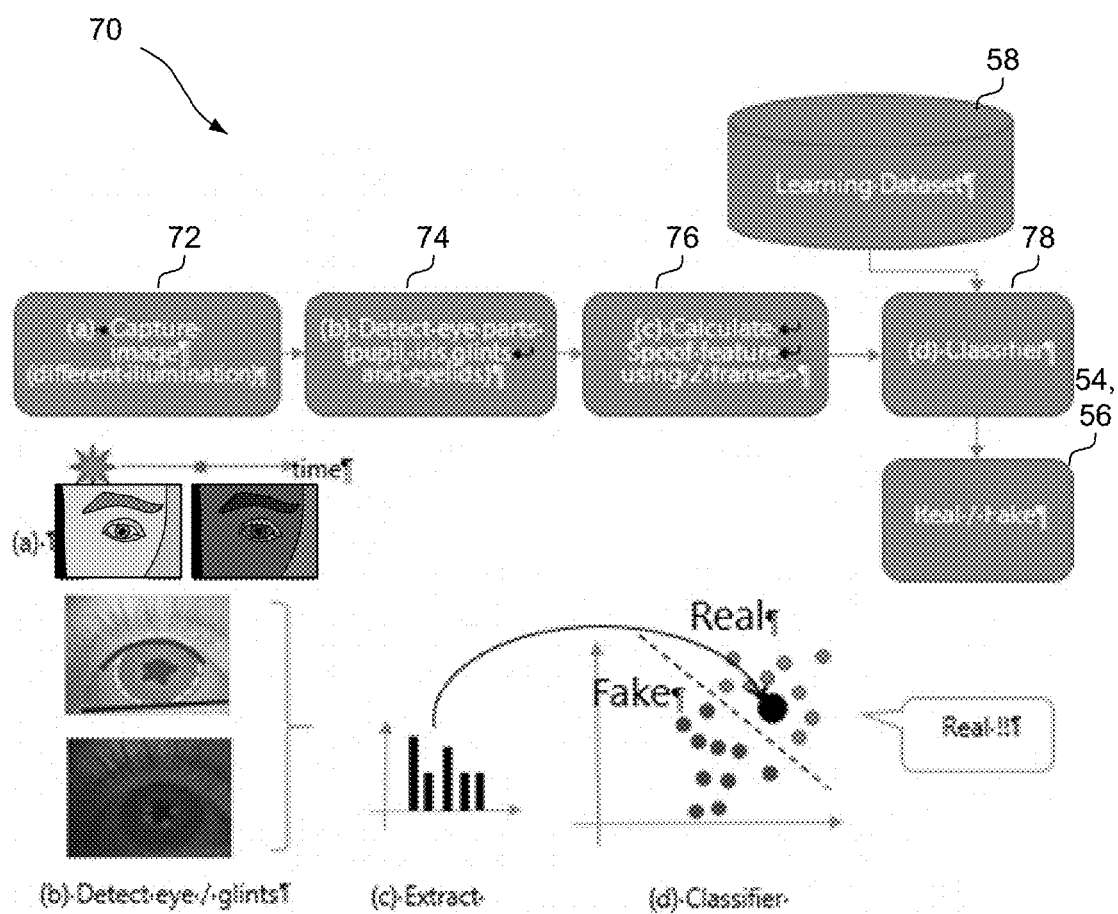
FIG. 2 is a schematic diagram of an example functional system that may be implemented by the computer device of FIG. 1.

Referring to FIG. 2, in one particular example, biometric object spoof detection and/or identification system 10 and/or at least biometric spoof detector component 14 may be implemented as an iris spoof detection system 70 including various functions that make a biometric object classification decision 53, e.g., whether biometric object 16 is real object 54 or fake object 56, based on reflectance intensity differences between the human living tissues (iris, sclera and skin) and the inanimate materials (paper, plastic, glass, etc.) of a spoofed biometric object (e.g., a spoofed eye) under different illumination characteristics. To detect reflectance intensity differences, even though living tissues and inanimate materials could reflect light in a similar fashion at one intensity, their differences are identified by varying the illumination characteristics over a short period.

Iris spoof detection system 70 could be used to build stronger, and more robust anti-spoofing systems for iris recognition, including functionalities such as: iris spoof detection functions that include reflectance analysis functions, including functions to control illumination brightness or exposure time with high frequency; a reflectance analysis function, specifically measuring an intensity of eye reflection as defined by a glint intensity; and a reflectance analysis function wherein an intensity of each part of eye is used, individually and or in combination (overall eye intensity).

More specifically, iris spoof detection system 70 may be composed of the following functions: (a) an image capture function 72 that captures 2 images with high/low illumination; (b) a detection or reflection analysis function 74: for the high illumination image, detect glints, pupil, iris, and eyelids, for the low illumination image, detect glints, and, if possible, pupil, iris and eyelids; (c) a feature extraction or object part detector function 76 to define windows for each part and calculate features; and (d) a classification function 78 that uses thresholds and/or machine learning/artificial intelligence approaches to predict whether biometric object 16 is fake or real.

It should be noted that the functions of iris spoof detection system 70 may be part of the components of biometric object spoof detection and/or identification system 10 and/or at least biometric spoof detector component 14. For example, image capture function 72 may be a part of image capture device 24, detection function 74 may be a part of reflectance analysis component 42 and/or object part detector component 48, feature extraction function 76 may be a part of reflectance analysis component 42 and/or object part detector component 48, and classification function 78 may be a part of object classifier component 50.

Image capture function 72 can change exposure time alternately (e.g., the two images in each of the one or more sets of images can have a different exposure time), and feature extraction function 76 can calculate spoof features using 2 images (which may be referred to as one of high/low illumination image). The features contain reflectance information.

To extract reflectance information, in some cases, system 70 may use glint intensity as a first measure, where the glint intensity comes from the reflectance of the light source off a human cornea. Since cornea has spherical shape (around 1.5 cm radius), the reflection pattern will be a small but high intensity circle in the image.

Figure 3:
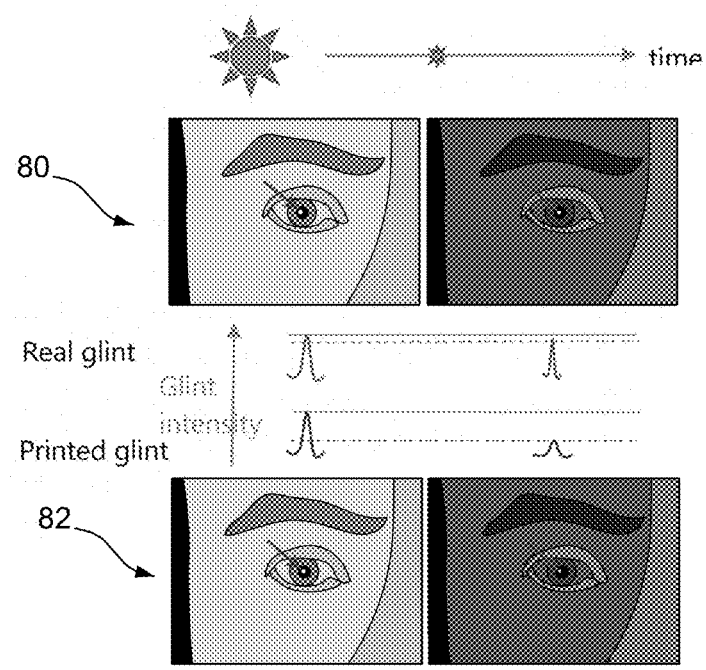
FIG. 3 is a diagram comparing relatively high and low illuminated images of real and fake eyes, and their corresponding difference in glint intensity.

Referring additionally to FIG. 3, which includes a pair of images 80 of a real eye and a pair of images 82 of a fake eye taken based on similar illumination characteristics, in case of a reflection off of a substantially flat glass (or off of glasses worn by a user), the corresponding reflection shape (called glares) is a much larger circle due to the difference in the surface's curvature. Hence, detection function 74 and/or feature extraction function 76 can distinguish the glass reflection (glares) and cornea glints.

Moreover, the intensities of the glints are always high in both of high and low illumination for the real eye (see images 80). On other hand, the glints intensities on the printed eye (images 82) are affected by this illumination change, because they are printed on the paper along with the iris and pupil, instead being reflected by the real corneal surface.

In some cases, however, the attacker could print an eye without glint patterns, and cover it with a spherical surface having a radius like the real cornea. To further substantiate the functionality, system 70 can be extended to look for changes in the texture pattern of the eye region (in addition to glint intensity) across varying illumination conditions. For example, classification function 78 can use a Local Binary Patterns function to measure the change in the response of the real eye, versus that of the printed eye, to illumination changes.

Further, in this case, feature extraction function 76, which may be a part of reflectance analysis component 42, may utilize the intensity of each part of the eye. It is important to point out a few differences in the reflectivity of inanimate flat surfaces and the living eye. Human tissue, such as skin or iris pattern, includes multiple layers with complex structure or collagen fibers, has a 3D structure, and does not include a highly reflective background like a paper.

Figure 4:
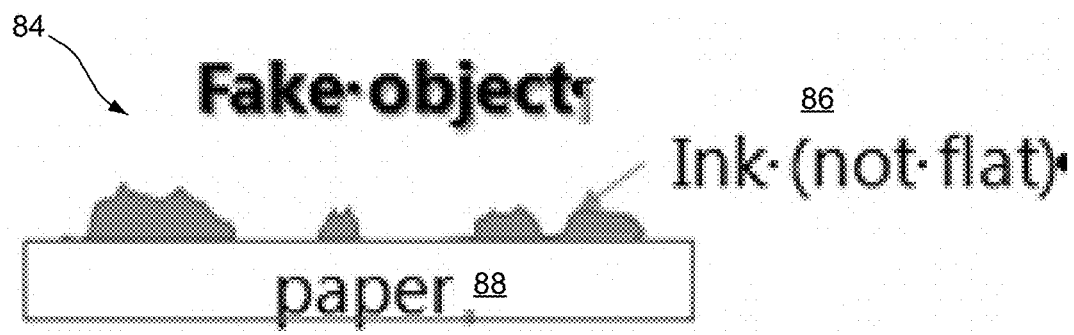
FIG. 4 is a cross sectional view of a fake biometric object, such as a fake eye, that may be used in an attempt to spoof biometric identification systems.

In contrast, additionally referring to FIG. 4, printed paper 84 has quite simple structure including sections of ink 86, each having various thicknesses, printed on a base layer 88 of paper. The fake material, like a fake printed paper 84, has different reflectance ratio and typically uses white/light paper as a back ground.

Figure 5:
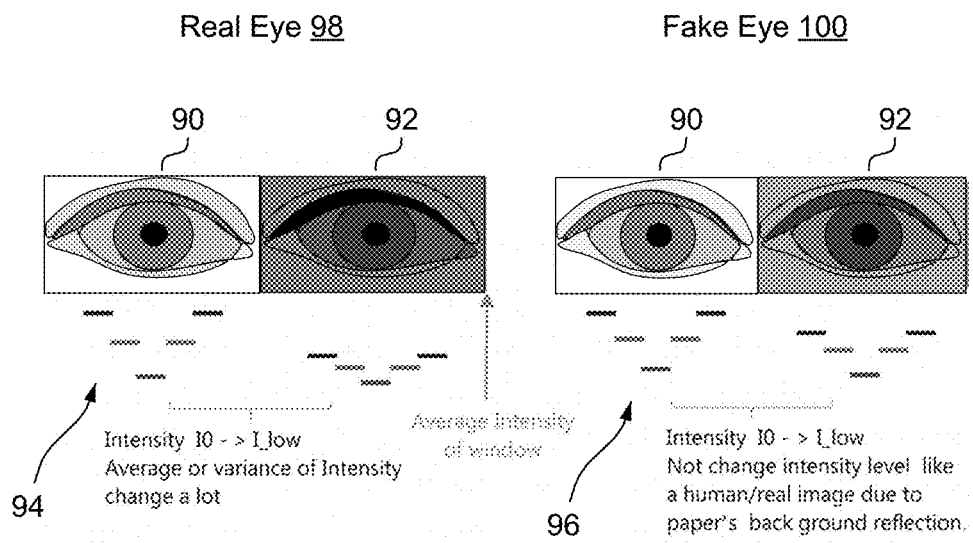
FIG. 5 is a diagram comparing relatively high and low illuminated images of real and fake eyes, and their corresponding differences in overall and regional reflected light intensity.
Figure 6:
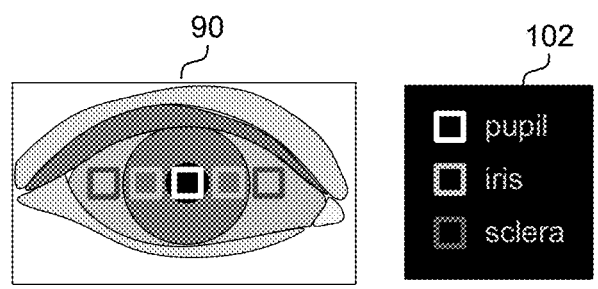
FIG. 6 is a diagram of a real eye image including boundaries marking different areas or regions of interest where a change in reflected light intensity may be compared between relatively high and low illuminated images.

Additionally referring to FIGS. 5 and 6, once illumination power of incident light gets higher 90 or lower 92, it influences the amount of change in the average intensity or variance 94 and 96 between these two classes, e.g., between real eye image 98 and fake eye image 100. Even though images of real eye 90 and fake eye 92 may look similar under normal (e.g., high) illumination, the changes in illumination across various regions of the eye cause those differences to surface. Using features like average intensity, variance and local binary patterns of different regions 102 (e.g., pupil, iris, sclera) of an image, such as real eye image 90, system 70 can distinguish them with much more confidence.

Figure 7:
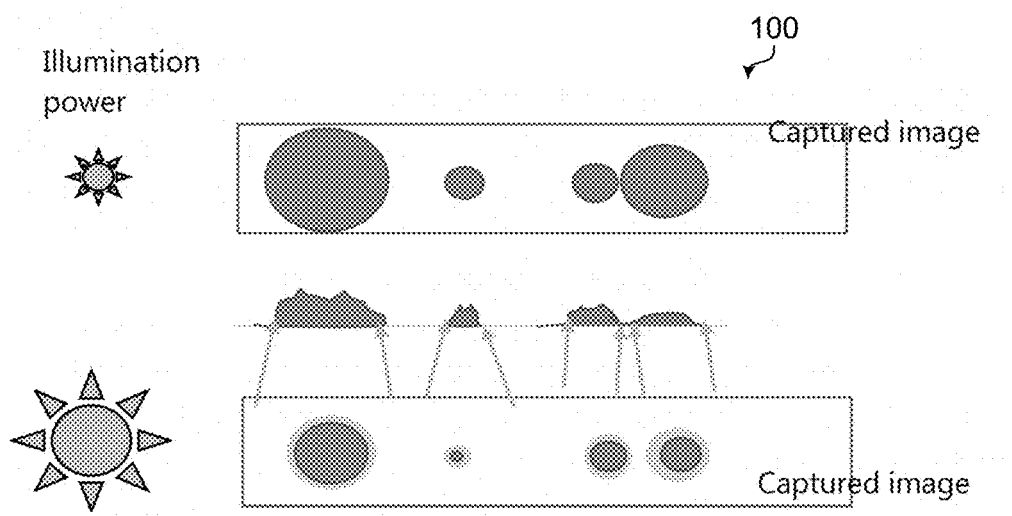
FIG. 7 is a diagram relating to a fake biometric object, separately including a top view of relatively low incident light intensity on different ink patterns, a corresponding cross sectional view of the ink patterns and the paper base layer, and a top view of relatively high incident light intensity on the different ink patterns.
Figure 8:
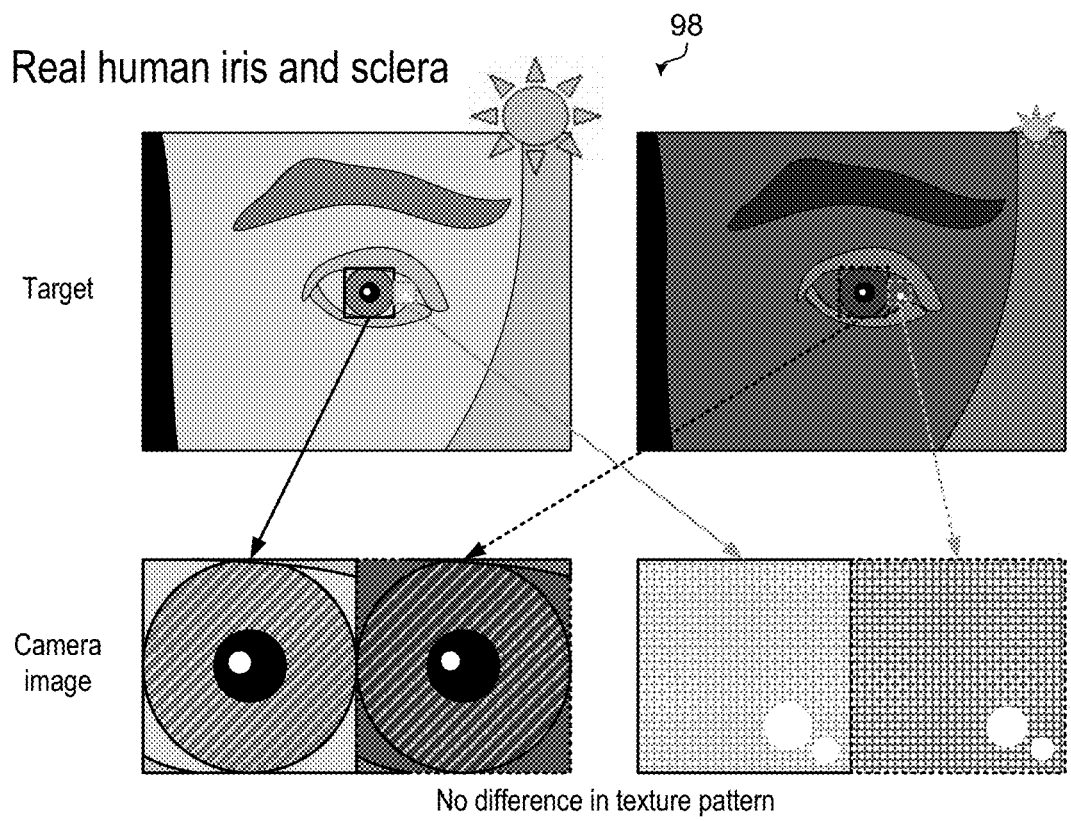
FIG. 8 is a diagram of relatively high and low illuminated images of a real eye and correspondingly detected texture patterns.
Figure 9:
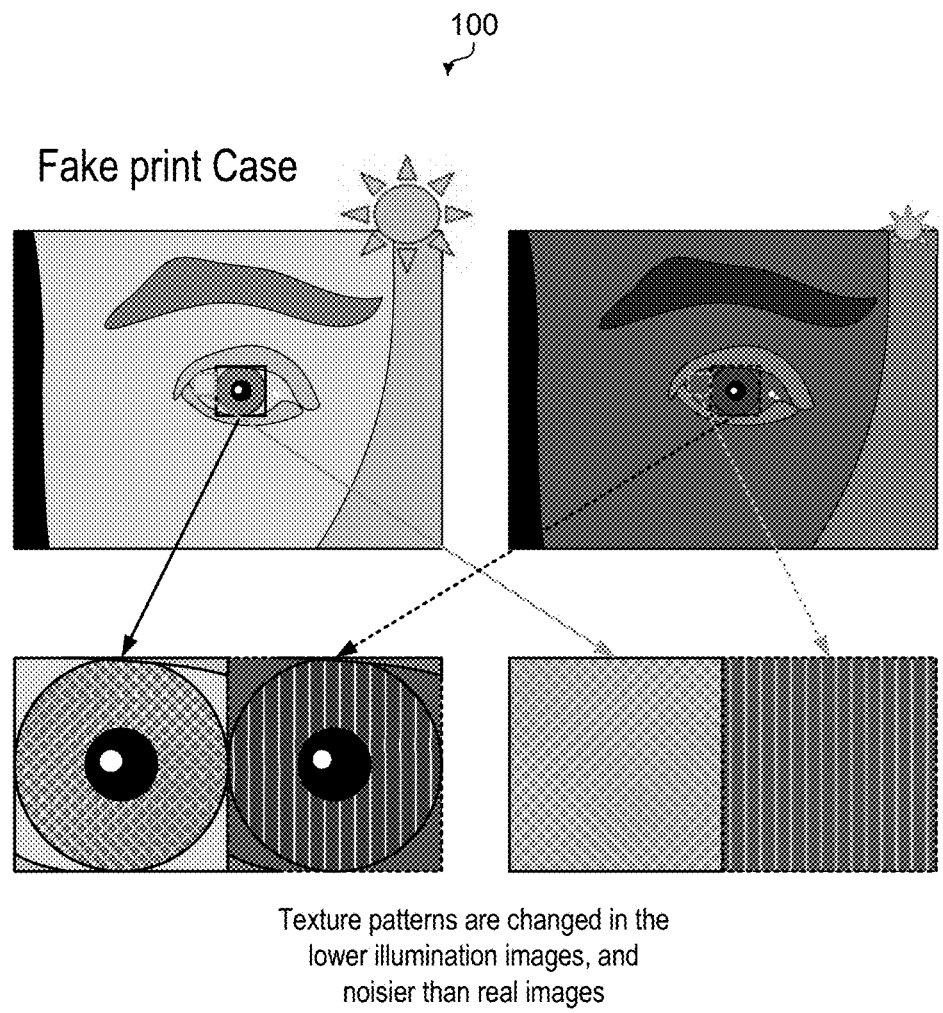
FIG. 9 is a diagram of relatively high and low illuminated images of a fake eye and correspondingly detected texture patterns.

Referring to FIGS. 7-9, the effect of lighting on real and fake objects is illustrated. For a fake eye image 100, such as in FIGS. 7 and 9, under the low illumination, the light is absorbed by the thinner and thicker ink regions alike. However, under the brighter illumination conditions, the light penetrates through thinner or the edges of ink areas, and is reflected off the paper. This causes the appearance to change more than that on the real eye. For the real eye image 98, referring to FIG. 8, the texture on human eye images comes from the structure of collagen fibers/organs, and comes from the refractive index difference between the tissues. As such, the texture patterns of the human eye, and hence real eye image 98, are much more consistent under different illumination. The change of texture is not significant, so system 70 uses local features such as LBP feature or variance of texture pattern to distinguish between real and fake eyes.

Figure 10:
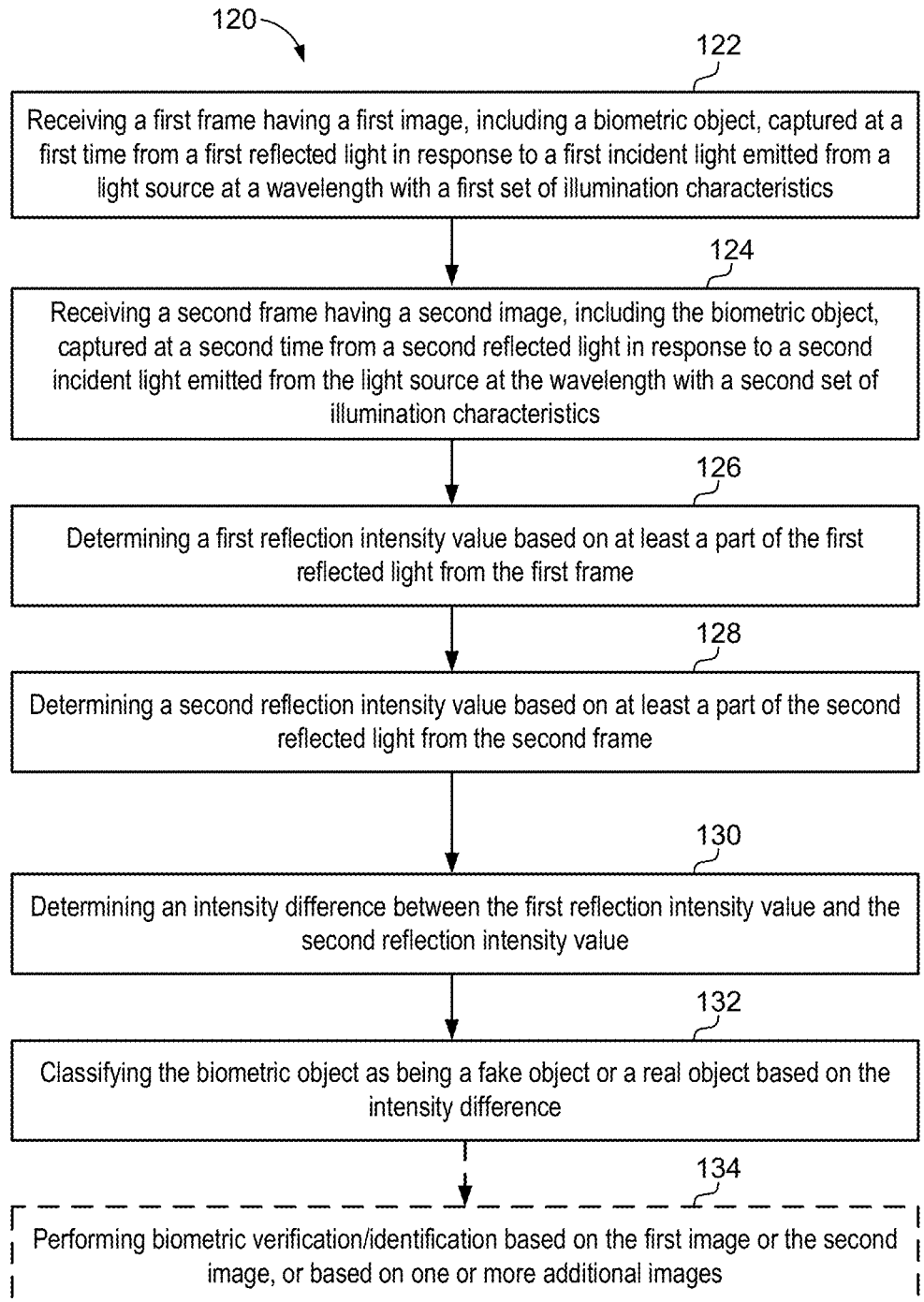
FIG. 10 is a flow chart of a method of biometric verification, which may be implemented on the computer device of FIG. 1 in accordance with the present disclosure.

Referring to FIG. 10, an example method 120 of biometric verification is described. The method 120 may be performed by computer device 12 and/or its sub-components as described with reference to FIG. 1. Although the method 120 is described below with respect to the elements of computer device 12, other components may be used to implement one or more of the steps described herein.

At block 122, the method 120 may include receiving a first image, including a biometric object, captured at a first time in response to a first incident light emitted from a light source at a wavelength with a first set of illumination characteristics. For example, block 122 may be performed by image capture device 24 and/or its associated functions as described with reference to FIGS. 1-9.

At block 124, the method 120 may include receiving a second image, including the biometric object, captured at a second time in response to a second incident light emitted from the light source at the wavelength with a second set of illumination characteristics. For example, block 124 may be performed by image capture device 24 and/or its associated functions described with reference to FIGS. 1-9.

At block 126, the method 120 may include determining a first set of one or more reflection intensity features based on at least a part of the first reflected light from the first image. For example, block 126 may be performed by reflectance analysis component 42 and/or its associated functions described with reference to FIGS. 1-9.

At block 128, the method 120 may include determining a second set of one or more reflection intensity features based on at least a part of the second reflected light from the second image, wherein each of the second set of one or more reflection intensity features corresponds to one of the first set of one or more reflection intensity features. For example, block 128 may be performed by reflectance analysis component 42 and/or its associated functions described with reference to FIGS. 1-9.

At block 130, the method 120 may include determining a set of one or more reflectance intensity difference features based on an intensity difference between at least one of the first set of one or more reflection intensity features and a corresponding set of at least one of the second set of one or more reflection intensity features. For example, block 130 may be performed by object classifier component 42 and/or its associated functions described with reference to FIGS. 1-9.

At block 132, the method 120 may include classifying the biometric object as being a fake object or a real object based on at least one of the set of one or more reflection intensity difference features. For example, block 132 may be performed by object classifier component 42 and/or its associated functions described with reference to FIGS. 1-9. Thus, method 120 makes biometric object classification decision 53 to identify the presented biometric object 16 as real or fake, which decision may be utilized to abort or continue a biometric identification process and allow access to a device. Method 120 thereby improves the efficiency of usage of computer device 12 by avoiding the unnecessary processing of spoofed biometric objects, and also helps to avoid spoofing the biometric identification process and allowing an unauthorized user to access to computer device 12, or another computer device or computer resource controlled by computer device 12.

Optionally (as indicated by dashed lines), at block 134, the method 120 may include performing biometric verification/identification based on the first image or the second image, or based on one or more additional images captured from light emitted from the light source when the classifying identifies the biometric object as the real object. For example, block 134 may be performed by biometric verification/identification component 42 and/or its associated functions described with reference to FIGS. 1-9.

In some cases, the biometric object 16 may be an eye including a real eye or a fake eye, wherein determining the first set of one or more reflection intensity features and the second set of one or more reflection intensity features respectively further comprise determining a first corneal glint intensity value of a glint of the first incident light off of a cornea of the eye and a second glint intensity value of the corresponding corneal glint of the second incident light off of the cornea of the eye.

In some cases, determining the first set of one or more reflection intensity features and the second set of one or more reflection intensity features respectively further comprise determining a first overall image-based reflection intensity feature of the first image and a second overall image-based reflection intensity feature of the second image. In other words, in this case, determining the set of one or more reflection intensity difference features includes determining an overall image intensity difference feature between the first image and the second image, and classifying the biometric object as being the fake object or the real object is based on the overall image intensity difference feature.

In some cases, such as where the biometric object 16 comprises an eye, determining the first set of one or more reflection intensity features and the second set of one or more reflection intensity features respectively further comprise determining a first set of one or more eye-part intensity features of a first set of one or more eye-parts of the first image and a second set of one or more eye-part intensity features of the corresponding set of one or more eye-parts of the second image. Also, in this case, determining the set of one or more reflection intensity difference features further comprises determining a set of one or more reflection intensity difference features between each respective one of the first set of one or more eye-part intensity features of the first image and the corresponding set of one or more eye-part intensity features of the second image. Additionally, in this case, classifying the biometric object as being fake or real based at least one of the set of reflection intensity difference features. In other words, in this case, determining the set of one or more intensity difference features includes determining one or more eye-part intensity difference features between corresponding eye-parts in the first image and the second image, and classifying the biometric object as being the fake object or the real object is based on the one or more eye-part intensity difference features. For example, the one or more eye-parts and the second set of one or more eye-parts may include at least one of or at least a portion of a pupil, an iris, a sclera, or a periocular region of the first image and the second image.

Also, in any of the cases described herein, the set of one or more reflection intensity difference features may include features such as, but not limited to, one or more of an intensity amplitude-based metric, an intensity variance metric, a metric based on features like local binary patterns, an intensity value-based metric, a pixel intensity-based metric, a local texture-based metric, or an intensity feature-based histogram.

In another case, the first set of illumination characteristics and the second set of illumination characteristics each include a different value of at least one of an illumination power, an exposure time, an angle of incidence, or any characteristic resulting in a different signal-to-noise ratio between the first image and the second image.

Also in any of the cases, determining the set of one or more reflection intensity difference features includes determining a glint intensity difference feature between corresponding corneal glints in the first image and the second image, and classifying the biometric object as being the fake object or the real object is based on the glint intensity difference feature.

Also, in some cases, the wavelength of the light source comprises one of a plurality of wavelengths within an infrared band of light.

Further, in some cases such as when the biometric object includes an eye having one or more eye-parts, the method may further include capturing the first image and the second image at a frame rate such that a position of at least a portion of each of the one or more eye-parts is substantially similar between the first image and the second image.

Additionally, in some cases such as when glint intensity is determined, the method may further include detecting two or more glint-like objects in at least one of the first image and the second image. Also, the method may include determining a size and a shape, respectively, of the two or more glint-like objects. Finally, in this case, the method may include distinguishing at least one glint from at least one glass-reflection-based glare based on the size and the shape, respectively, of the two or more glint-like objects, or determining any other approach to detect glints on the cornea.

Figure 11:
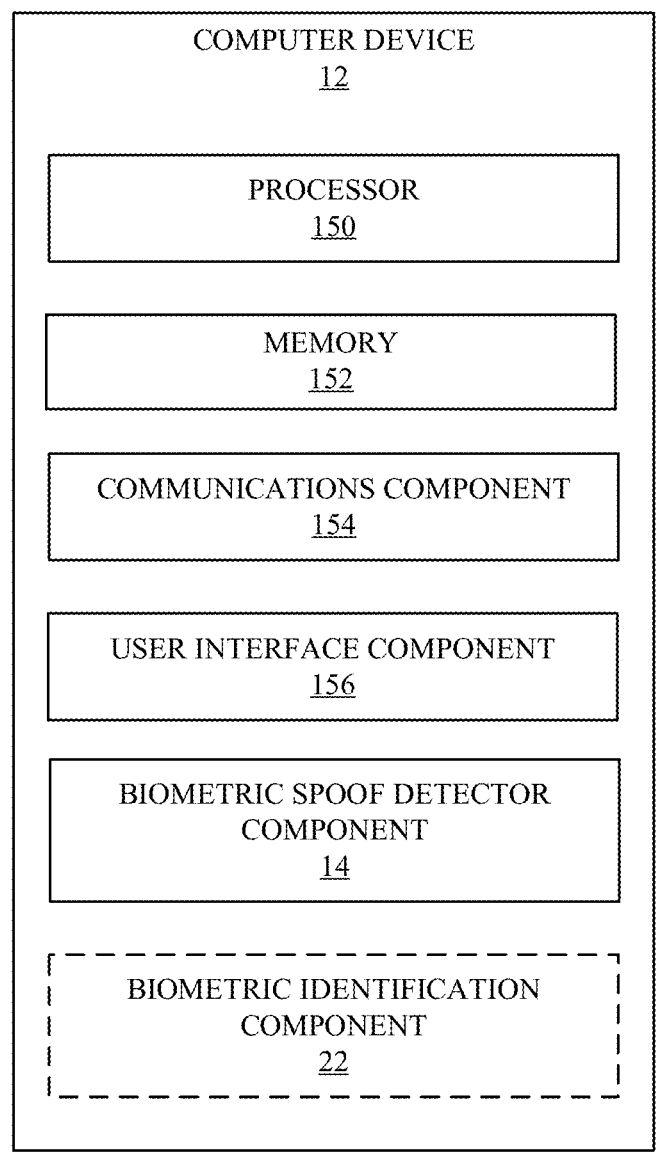
FIG. 11 is a block diagram of an additional example of the computer device of FIG. 1, including additional components, in accordance with the present disclosure.

Referring now to FIG. 11, a more detailed example of computer device 12 includes additional components that may be utilized to implement the functionality described herein. In some examples, computer device 12 may include a processor 150 for executing biometric spoof detector component 14 and/or biometric verification/identification component 22 for carrying out one or more functions (e.g., method 120) described herein. The processor 150 may include a single or multiple set of processors or multi-core processors. Moreover, the processor 150 can be implemented as an integrated processing system and/or a distributed processing system.

Computer device 12 may further include memory 152, such as for storing local versions of applications being executed by the processor 150, such as an application defining biometric spoof detector component 14 and/or biometric verification/identification component 22, and/or an application (e.g., a gaming application, a social interfacing application, etc.) that may accessed based on operation of biometric spoof detector component 14 and/or biometric verification/identification component 22. In some aspects, the memory 152 may be implemented as a single memory or partitioned memory. In some examples, the operations of the memory 152 may be managed by the processor 150. Memory 152 can include a type of memory usable by a computer, such as random access memory (RAM), read only memory (ROM), tapes, magnetic discs, optical discs, volatile memory, non-volatile memory, and any combination thereof. Additionally, the processor 150 and memory 152 may include and execute an operating system that performs the functionality of biometric spoof detector component 14 and/or biometric verification/identification component 22 and/or method 120.

Further, computer device 12 may include a communications component 154 that provides for establishing and maintaining communications with one or more parties utilizing hardware, software, and services as described herein. Communications component 154 may carry communications between components on computer device 12, as well as between computer device 12 and external devices, such as to electronic devices coupled, e.g., via a wired or wireless link, locally to computer device 12 and/or located across a communications network. For example, communications component 154 may include one or more buses operable for interfacing with internal components and one or more interfaces for interfacing with external devices.

Computer device 12 may also include a user interface component 156 operable to receive inputs from a user of computer device 12 and further operable to generate outputs for presentation to the user. User interface component 156 may include one or more input devices, including but not limited to a touch-sensitive display, a navigation key, a function key, a microphone, a voice recognition component, any other mechanism capable of receiving an input from a user, or any combination thereof. Further, user interface component 156 may include one or more output devices, including but not limited to a display, a speaker, any other mechanism capable of presenting an output to a user, or any combination thereof.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a device (e.g., computer device 12), which can be a wired device or a wireless device. A wireless device may be a computer, a gaming device, cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Further, a wired device may include a server operable in a data centers (e.g., cloud computing).

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various aspects or features are presented in terms of systems that may include a number of devices, components, modules, and the like. It is to be understood and appreciated that the various systems may include additional devices, components, modules, etc., and/or may not include all of the devices, components, modules etc. discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof specially-designed to perform the functions described herein. A specially programmed general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in computer device 12. In the alternative, the processor and the storage medium may reside as discrete components in computer device 12. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While aspects of the present disclosure have been described in connection with examples thereof, it will be understood by those skilled in the art that variations and modifications of the aspects described above may be made without departing from the scope hereof. Other aspects will be apparent to those skilled in the art from a consideration of the specification or from a practice in accordance with aspects disclosed herein.

What is claimed is:

1. A method of biometric object spoof detection, comprising:
   receiving a first image, including an eye, captured at a first time in response to a first incident light emitted from a light source at a wavelength with a first set of illumination characteristics;
   receiving a second image, including the eye, captured at a second time in response to a second incident light emitted from the light source at the wavelength with a second set of illumination characteristics;
   determining a first set of one or more corneal glints in the first image;
   determining a second set of one or more corneal glints in the second image, wherein each of the second set of one or more corneal glints corresponds to one of the first set of one or more corneal glints;
   determining a glint intensity difference feature between corresponding corneal glints in the first image and the second image; and
   classifying the eye as being a fake eye or a real eye based on the glint intensity difference feature.

2. The method of claim 1, further comprising:
   determining an overall image intensity difference feature between the first image and the second image; and
   wherein classifying the eye as being the fake eye or the real eye is further based on the overall image intensity difference feature.

3. The method of claim 1, further comprising:
   determining one or more eye-part intensity difference features between corresponding eye-parts in the first image and the second image; and
   wherein classifying the eye as being the fake eye or the real eye is further based on the one or more eye-part intensity difference features.

4. The method of claim 3, wherein the corresponding eye-parts in the first image and the second image include at least one of a pupil, an iris, a sclera, or a periocular region of the first image and the second image.

5. The method of claim 1, wherein determining the glint intensity difference feature includes determining one or more of an intensity amplitude-based metric, an intensity variance-based metric, a local binary pattern-based metric, a pixel intensity-based metric, a local texture-based metric, or an intensity feature-based histogram.

6. The method of claim 1, wherein the first set of illumination characteristics and the second set of illumination characteristics each comprise a different value of at least one of an illumination power, an exposure time, an angle of incidence, or a characteristic resulting in a different signal-to-noise ratio between the first image and the second image.

7. The method of claim 1, wherein the wavelength of the light source comprises one of a plurality of wavelengths within an infrared band of light.

8. The method of claim 1, further comprising:
   capturing the first image and the second image at a frame rate such that a position of at least a portion of the eye is substantially similar between the first image and the second image.

9. The method of claim 1, further comprising:
   detecting two or more glint-like objects in at least one of the first image and the second image;
   determining a size and a shape, respectively, of the two or more glint-like objects;
   distinguishing at least one glint from other glass-reflection-based glare based on the size and the shape, respectively, of the two or more glint-like objects.

10. The method of claim 1, further comprising:
    performing biometric identification based on the first image or the second image, or based on one or more additional images of the eye received in response to an additional incident light emitted from the light source at the wavelength.

11. A computer device for biometric object spoof detection, comprising:
    a processor; and
    a memory in communication with the processor, wherein the processor is configured to:
      receive a first image, including an eye, captured at a first time in response to a first incident light emitted from a light source at a wavelength with a first set of illumination characteristics;
      receive a second image, including the eye, captured at a second time in response to a second incident light emitted from the light source at the wavelength with a second set of illumination characteristics;
      determine a first set of one or more corneal glints in the first image;
      determine a second set of one or more corneal glints in the second image, wherein each of the second set of one or more corneal glints corresponds to one of the first set of one or more corneal glints;
      determine a glint intensity difference feature between corresponding corneal glints in the first image and the second image; and
      classify the eye as being a fake eye or a real eye based on the glint intensity difference feature.

12. The computer device of claim 11, wherein the processor is further configured to:

determine an overall image intensity difference feature between the first image and the second image; and classify the eye as being the fake eye or the real eye further based on the overall image intensity difference feature.

13. The computer device of claim 11, wherein the processor is further configured to:

determine one or more eye-part intensity difference features between corresponding eye-parts in the first image and the second image; and classify the eye as being the fake eye or the real eye further based on the one or more eye-part intensity difference features.

14. The computer device of claim 13, wherein the corresponding eye-parts in the first image and the second image include at least one of a pupil, an iris, a sclera, or a periocular region of the first image and the second image.

15. The computer device of claim 11, wherein the glint intensity difference feature includes one or more of an intensity amplitude-based metric, an intensity variance-based metric, a local binary pattern-based metric, a pixel intensity-based metric, a local texture-based metric, or an intensity feature-based histogram.

16. The computer device of claim 11, wherein the first set of illumination characteristics and the second set of illumination characteristics each comprise a different value of at least one of an illumination power, an exposure time, an angle of incidence, or a characteristic resulting in a different signal-to-noise ratio between the first image and the second image.

17. The computer device of claim 11, wherein the wavelength of the light source comprises one of a plurality of wavelengths within an infrared band of light.

18. The computer device of claim 11, wherein the processor is further configured to:

capture the first image and the second image at a frame rate such that a position of at least a portion of the eye is substantially similar between the first image and the second image.

19. The computer device of claim 11, wherein the processor is further configured to:

detect two or more glint-like objects in at least one of the first image and the second image;

determine a size and a shape, respectively, of the two or more glint-like objects; and distinguish at least one glint from other glass-reflection-based glare based on the size and the shape, respectively, of the two or more glint-like objects.

20. The computer device of claim 11, wherein the processor is further configured to:

perform biometric identification based on the first image or the second image, or based on one or more additional images of the eye received in response to an additional incident light emitted from the light source at the wavelength.

21. A non-transitory computer readable medium storing one or more instructions executable by a computer device, the one or more instructions causing the computer device to:

receive a first image, including an eye, captured at a first time in response to a first incident light emitted from a light source at a wavelength with a first set of illumination characteristics;

receive a second image, including the eye, captured at a second time in response to a second incident light emitted from the light source at the wavelength with a second set of illumination characteristics;

determine a first set of one or more corneal glints in the first image;

determine a second set of one or more corneal glints in the second image, wherein each of the second set of one or more corneal glints corresponds to one of the first set of one or more corneal glints;

determine a glint intensity difference feature between corresponding corneal glints in the first image and the second image; and classify the eye as being a fake eye or a real eye based on the glint intensity difference feature.

22. The non-transitory computer readable medium of claim 21, wherein the one or more instructions further cause the computer device to:

determine an overall image intensity difference feature between the first image and the second image; and classify the eye as being the fake eye or the real eye based on the overall image intensity difference feature.

23. The non-transitory computer readable medium of claim 21, wherein the one or more instructions further cause the computer device to:

determine one or more eye-part intensity difference features between corresponding eye-parts in the first image and the second image; and classify the eye as being the fake eye or the real eye based on the one or more eye-part intensity difference features.

* * * * *